Nov. 29, 1949     N. L. MAY     2,489,383
POWER EDGER
Filed Sept. 4, 1947     3 Sheets-Sheet 2
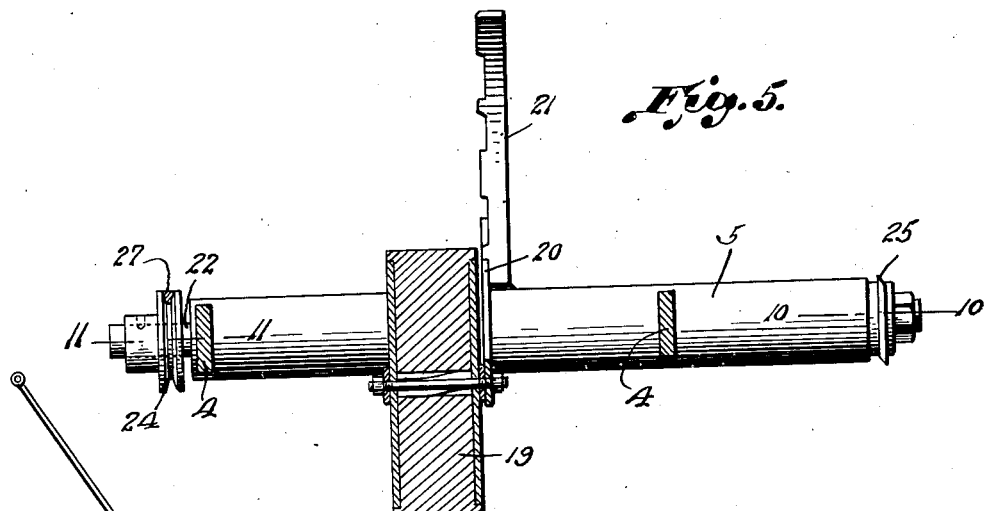
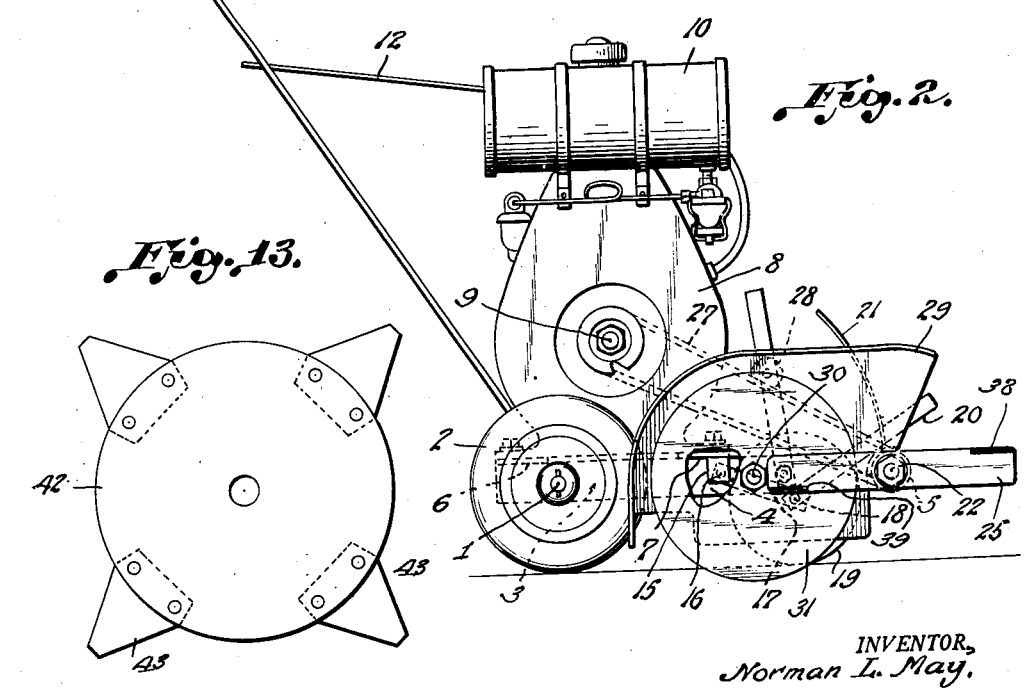
INVENTOR,
Norman L. May.
BY
E. S. Vrooman & Co.,
ATTORNEYS.

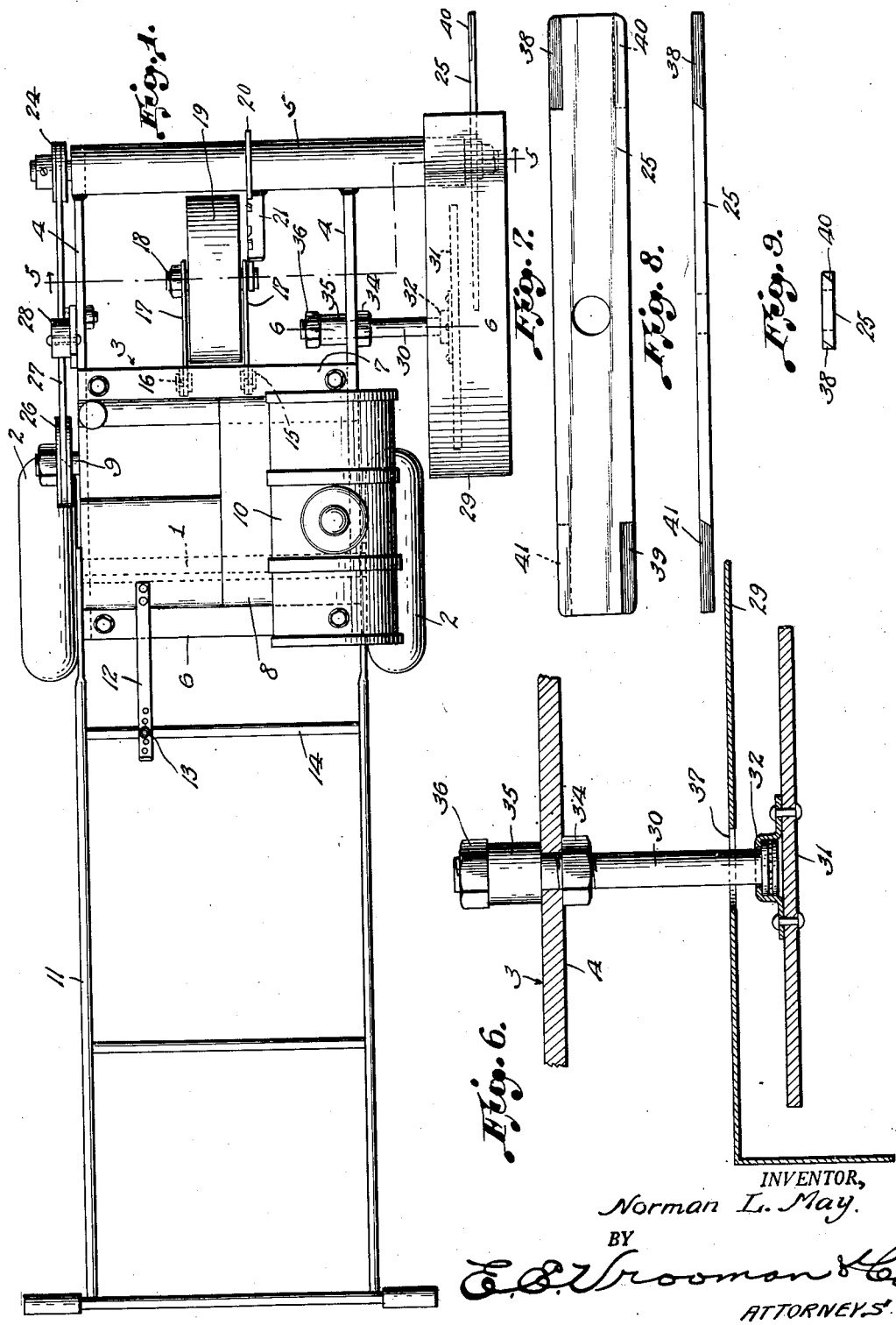

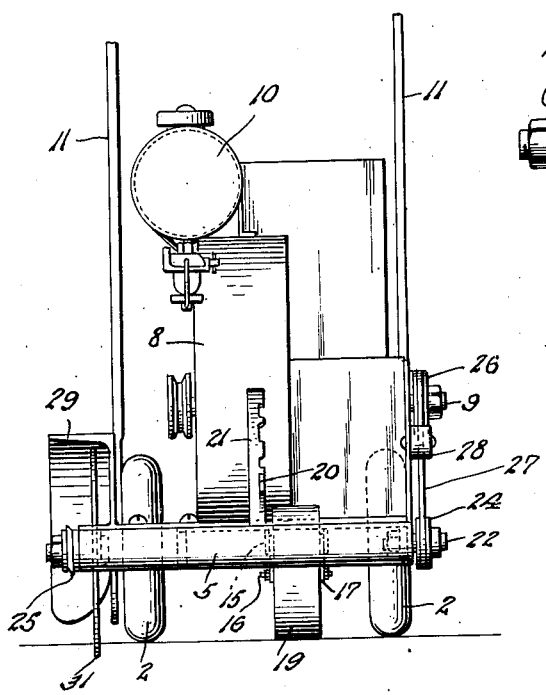
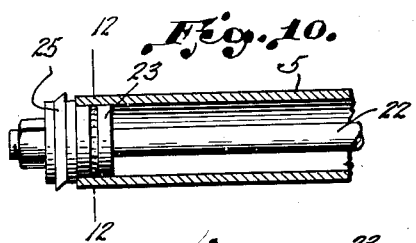
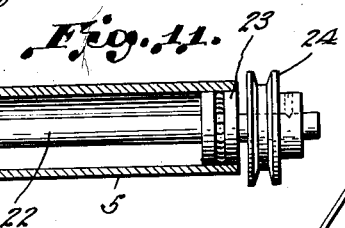
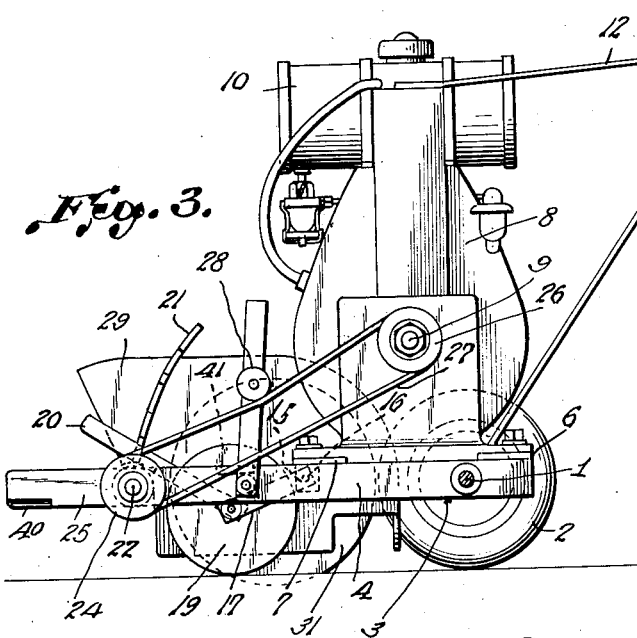
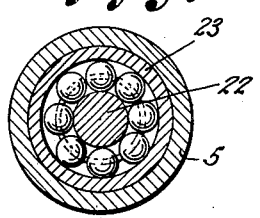

Patented Nov. 29, 1949

2,489,383

UNITED STATES PATENT OFFICE 2,489,383

POWER EDGER

Norman L. May, Miami Springs, Fla.

Application September 4, 1947, Serial No. 772,086

7 Claims. (Cl. 30—276)

This invention relates to a power edger.

An object of the invention is the production of a comparatively simple and efficient machanism whereby a person can edge the lawn contiguous to walks and curbs, as well as form a neat edging around flower beds and the like.

Another object of the invention is the production of a machine which can be easily operated by a person, and which will be adjustable to enable the operator to efficiently cut and trim the grass or lawn along sidewalks, and/or curbs, as well as trimming around flower beds and the like.

A still further object of the invention is the construction of a machine which is provided with a detachable disc-carrying support, whereby the machine can be converted into an admirable flower-bed trimming mechanism when desired, or it can be converted back into an efficient edger for sidewalks and/or curbs and the like.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Fig. 1 is a top-plan view of a machine constructed in accordance with the present invention, while Fig. 2 is a view in side elevation of the same.

Fig. 3 is a view in side elevation of the opposite side of the machine as that shown in Fig. 2.

Fig. 4 is a view in front elevation.

Fig. 5 is an enlarged, transverse sectional view taken on line 5—5, Fig. 1, and looking in the direction of the arrow.

Fig. 6 is an enlarged sectional view taken on line 6—6, Fig. 1.

Fig. 7 is a plan view of the cutting blade, while

Fig. 8 is a view in edge or side elevation.

Fig. 9 is an end view of the cutting blade.

Fig. 10 is a longitudinal, sectional view taken on line 10—10, Fig. 5.

Fig. 11 is a longitudinal, sectional view taken on line 11—11, Fig. 5.

Fig. 12 is an enlarged sectional view taken on line 12—12, Fig. 10.

Fig. 13 is a plan view of a roughing disc.

Referring to the drawings, in which the preferred embodiment of the invention is illustrated, 1 designates the main axle of the machine, upon which is mounted two wheels 2. A frame 3 comprises two side-bars 4 integral at their front ends with a cylinder-like sleeve 5. Axle 1 extends through said side-bars 4, Fig. 3; frame 3 is pivotally mounted on said main axle 1.

Mounted on the side-bars 4 is a rear-transverse plate 6 and a central-transverse plate 7 (Fig. 3). A motor 8 is supported upon frame 3 and its transverse plate 7. The motor 8 is provided with a drive-shaft 9, for the purpose hereinafter described. The machine is provided with a fuel-tank 10, and also with a handle 11; the handle 11 being provided with a brace 12. Brace 12 is adjustably connected at 13, Fig. 1, to one of the cross-pieces 14 of handle 11.

Depending from the central-transverse plate 7 are two lugs 15. Pivotally attached at 16 to lugs 15 are links 17. A bolt 18 (Fig. 1) extends through the outer portions of the link 17, and on this bolt 18 is mounted the front wheel 19. A lever 20 is pivotally mounted near its inner end upon bolt 18. A vertically-extending toothed rack 21 is integrally secured at its lower end to sleeve 5, and this rack is engaged by lever 20. Therefore, when the lever 20 is placed in different notches of toothed rack 21, the wheel 19 will be raised or lowered, as the operator desires. This raising and lowering will change the height of the outer end of frame 3, for the purpose hereinafter described.

Extending through sleeve 5 is an auxiliary shaft 22, Figs. 10 and 11. This shaft 22 is journaled in ball-bearing devices 23, so that it runs smoothly and efficiently. Fixedly secured on auxiliary shaft 22, near one end, is pulley 24, while near its other end is fixedly secured cutting-blade 25. The drive-shaft 9 is provided with a pulley 26 over which passes belt 27; belt 27 is also positioned upon pulley 24 whereby, when the motor 8 is operating, the auxiliary shaft 22 will be rotated. A suitable belt-tightener 28 is mounted upon the frame 3, and engages belt 27 for keeping the same properly taut.

The cutting-blade 25 is rotated when the shaft 22 is rotated.

The cutting-blade 25 is under a guard 29, which guard 29 is secured to frame 3. This guard is provided primarily for preventing dirt from being thrown above the guard position.

Another important feature of my invention is the following device: A stub-shaft 30 (Fig. 6) extends through one of the side-bars 4 of frame 3, and on the outer end of stub-shaft 30 is mounted disc 31; this disc 31 has a casing 32 in which is mounted a ball-bearing device 33, whereby disc 31 revolves easily on stub-shaft 30. The shaft 30 is provided with nut 34 against the outer face of bar 3, while a sleeve 35 bears against the inner face of bar 3; sleeve 35 being mounted on the stub-shaft 30, and has a nut 36 against its outer end. The stub-shaft 30 extends through an aperture 37 formed in the guard 29. Normally when edging the grass along a walk, the guide disc 31 rubs against the edge of the walk, while the cutting-blade 25 does the edging or trimming. When it is desired to edge or trim along a curb, the nut 36 is removed, as well as sleeve 35, from stub-shaft 30, and the sleeve 35 is placed on shaft 30 against the outside face of the bar 4, with nut 36 clamped against the inner face of bar 4. This places the guide disc 31 farther out, beyond the cutting-blade 25. Thus, as the guide disc 31 rubs against the curb, the cutting-blade will be trimming the grass near the curb. Therefore, it will be seen that this device, particularly as shown in Fig. 6, is adjustable for either walk-trimming or curb-trimming.

The cutting-blade 25 is sharpened at 38 and 39 on one side, while on its opposite side it is sharpened at 40 and 41, Figs. 7, 8 and 9. This permits the operator to reverse the blade when the cutting edges on one side become dull, and thereby provides sharp edges when desired.

In Fig. 13 is shown a disc 42 with cutters 43 extending therefrom. This disc 42 may be used for rough work, and can be substituted for the cutting-blade 25.

It will be obvious that the operator can raise or lower the position of the outer ends of the frame 3 through the adjustment of the lever 20 in the notches of the toothed rack 21. The lower the lever 20 is placed in the rack, the higher the outer end of the frame 3 will be raised. Thus, by placing the lever 20 in the highest notch of the toothed rack 21, the frame 3 will be placed in its lowest position with respect to the ground; consequently, if the lever 20 is placed in the lowest notch of the rack, the end of the frame will be in its highest position with respect to the ground. These adjustments of the frame 3 are desirable for certain trimmings of the lawn or parking.

In trimming around flower-beds, it is desirable to remove the disc 31 and its attaching means to the frame (Fig. 6), leaving only the cutting-blade 25 for this operation.

It will be obvious that while I have shown a gasoline motor, an electrical motor may be provided, as the means for driving the rotary blade 25 is optional with the operator.

This machine is pushed forward by the operator, and it rolls very free due to the roll-bearings in the wheels (not shown). The adjustment both with respect to the forward end of the frame 3 and the guiding disc 31 can be easily obtained as both operations are simple, resulting in efficient effects.

Referring to the guard 29, it is of sufficient width to cover the cutting-blade 25 and the guiding disc 31, Fig. 4. The guard 29 is also of sufficient length to extend behind the blade 25 and disc 30, as will be seen upon referring to Fig. 3. Therefore, no dirt or "choppings" can be thrown into the air, nor rearward of the guard 29.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a power edger, the combination of a horizontal frame provided with a transverse plate fastened thereon, links under said transverse plate and means fastening the inner ends of said links to said transverse plate, a wheel between said links and means mounting said wheel on said links, a lever and means attaching said lever to said links, a hollow sleeve and means fastening said sleeve to said horizontal frame, a toothed rack fixedly secured to said hollow sleeve, said lever normally engaging said toothed rack, a rotatable shaft extending through said hollow sleeve, cutting means mounted on said rotatable shaft, and means for rotating said shaft.

2. In a power edger, the combination of a hollow frame comprising two side bars, a hollow sleeve integrally connected at its ends to the inner ends of said side bars, a rotatable shaft extending through said hollow sleeve, said shaft provided with two ball-bearing devices, positioned within the ends of said hollow sleeve, cutting means mounted on one end of said shaft contiguous to one end of said hollow sleeve, said shaft provided with a pulley on one end contiguous to an end of said hollow sleeve, and means connected to said pulley for rotating said shaft.

3. In a power edger, the combination of a horizontal frame comprising parallel side bars, a horizontal stub-shaft extending through one of said side bars, a rotatable disc and means fastening said disc on the outer end of said stub-shaft, a nut on said stub-shaft and against the outer face of said side bar, a hollow sleeve on said stub-shaft and against the inner face of said side bar, and a nut on said stub-shaft against the outer end of said sleeve.

4. In a power edger, the combination of a horizontal frame including vertically positioned side bars, a stub-shaft extending through one of said side bars, a nut on said stub-shaft directly against one face of said side bar, a hollow sleeve on said stub-shaft and having one end bearing directly against one face of said side bar, a nut on said stub-shaft and directly against the outer end of said hollow sleeve, a disc contiguous to the outer end of said stub-shaft, a casing fastened to said disc and surrounding the outer end of said stub-shaft, and a ball-bearing device in said casing and on the outer end of said stub-shaft.

5. In a power edger, the combination of a horizontal frame comprising two parallel side bars and a hollow cylinder-like sleeve connected to the front ends of said side bars, a wheel and means movably mounting said wheel on said horizontal frame, means for adjusting the vertical position of said wheel mounted on the central part of said cylinder-like sleeve and connected by means to said wheel, a rotatable shaft provided with ball-bearing devices within said cylinder-like sleeve, cutting means mounted on one end of said shaft, and means for rotating said shaft connected to one of its ends, substantially as shown and described.

6. In a power edger, the combination of a horizontal frame comprising vertically positioned side bars, a guard and means securing said guard to said frame, said guard provided with a vertical aperture, a stub-shaft extending horizontally through one of said side bars and through said vertical aperture, a disc on the outside of said guard and mounted on the outer end of said stub-shaft, a nut on said stub-shaft against one side of said side bar, a hollow sleeve on said stub-shaft and directly against one side of said side bar, and a nut on said stub-shaft and directly against the outer end of said sleeve.

7. In a power edger, the combination of a horizontal frame having a hollow horizontal cylinder-like sleeve comprising its front end, a guard mounted on said cylinder-like sleeve near one of its ends, a stub-shaft mounted on said frame and extending through a portion of said guard, a disc under part of said guard and mounted on the outer end of said stub-shaft, and removable fastening means on said stub-shaft and engaging opposite portions of said frame for adjustably mounting said stub-shaft upon said frame.

NORMAN L. MAY.

REFERENCES CITED

The following references are of record in the file of this patent:

UNITED STATES PATENTS

| Number | Name | Date |
|---|---|---|
| 876,386 | McMaster | Jan. 14, 1908 |
| 1,009,269 | Van Sickle | Nov. 21, 1911 |
| 1,171,886 | Ray | Feb. 15, 1916 |
| 1,257,666 | Barnes | Feb. 26, 1918 |
| 1,582,359 | Trowbridge | Apr. 27, 1926 |
| 2,028,784 | Jennett | Jan. 28, 1936 |
| 2,432,922 | Muzzy | Dec. 16, 1947 |